(12) United States Patent
Jang (10) Patent No.: US 8,599,770 B2
(45) Date of Patent: Dec. 3, 2013

(54) SCHEDULING INFORMATION SHARING PROTOCOL OF COMMUNICATION SYSTEM

(75) Inventor: Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 480 days.

(21) Appl. No.: 12/639,519

(22) Filed: Dec. 16, 2009

(65) Prior Publication Data

US 2010/0303029 A1    Dec. 2, 2010

(30) Foreign Application Priority Data

May 29, 2009   (KR) .................. 10-2009-0047626

(51) Int. Cl.
*H04W 4/00*     (2009.01)
(52) U.S. Cl.
USPC ....................................... 370/329
(58) Field of Classification Search
None
See application file for complete search history.

(56) References Cited

U.S. PATENT DOCUMENTS

| | | | |
|---|---|---|---|
| 2006/0014554 A1* | 1/2006 | Gerlach ................. | 455/501 |
| 2007/0206561 A1* | 9/2007 | Son et al. .............. | 370/346 |
| 2007/0211662 A1* | 9/2007 | Hyon et al. ............ | 370/329 |
| 2007/0280175 A1* | 12/2007 | Cheng et al. .......... | 370/338 |
| 2009/0092090 A1* | 4/2009 | Beems Hart et al. ... | 370/329 |
| 2012/0093093 A1* | 4/2012 | Frenger et al. ........ | 370/329 |

FOREIGN PATENT DOCUMENTS

| | | |
|---|---|---|
| JP | 2007-243425 | 9/2007 |
| KR | 1020000075801 | 12/2000 |
| KR | 1020070112932 | 11/2007 |
| KR | 10-0837061 | 6/2008 |
| KR | 1020080085886 | 9/2008 |

* cited by examiner

*Primary Examiner* — Chirag Shah
*Assistant Examiner* — Srinivasa Reddivalam
(74) *Attorney, Agent, or Firm* — NSIP Law (57) ABSTRACT

Described herein is a method of sharing a frequency resource between a plurality of transmission/reception pairs in a communication system. Also described is an inner-cell coordinator included in the communication system that may be used to carry out the method of sharing a frequency resource between a plurality of transmission/reception pairs.

18 Claims, 10 Drawing Sheets

COORDINATED SET(CS)
CS1 = {(BS1,MS1-1), (BS2,MS2-1), (BS3,MS3-1)}
CS2 = {(BS1,MS1-2), (BS2,MS2-2), (BS3,MS3-2)}

CS1:

| | $i_{BS}$ | GAP |
|---|---|---|
| BS1 | 1 | 2 SUB-FRAMES |
| BS2 | 2 | 1 SUB-FRAME |
| BS3 | 3 | 0 SUB-FRAME |

CS2:

| | $i_{BS}$ | GAP |
|---|---|---|
| BS1 | 3 | 0 SUB-FRAME |
| BS2 | 2 | 1 SUB-FRAME |
| BS3 | 1 | 2 SUB-FRAMES |

COORDINATED SET = {(BS1,MS1), (BS2,MS2), (BS3,MS3)}

|  | $i_{BS}$ | GAP |
|---|---|---|
| BS1 | 1 | 2 SUB-FRAMES |
| BS2 | 2 | 1 SUB-FRAME |
| BS3 | 3 | 0 SUB-FRAME |

COORDINATED SET(CS)
CS1 = {(BS1,MS1-1), (BS2,MS2-1), (BS3,MS3-1)}
CS2 = {(BS1,MS1-2), (BS2,MS2-2), (BS3,MS3-2)}

CS1:

|  | $i_{BS}$ | GAP |
| --- | --- | --- |
| BS1 | 1 | 2 SUB-FRAMES |
| BS2 | 2 | 1 SUB-FRAME |
| BS3 | 3 | 0 SUB-FRAME |

CS2:

|  | $i_{BS}$ | GAP |
| --- | --- | --- |
| BS1 | 3 | 0 SUB-FRAME |
| BS2 | 2 | 1 SUB-FRAME |
| BS3 | 1 | 2 SUB-FRAMES |

FIG. 10

SCHEDULING INFORMATION SHARING PROTOCOL OF COMMUNICATION SYSTEM

CROSS-REFERENCE TO RELATED APPLICATION

This application claims the benefit under 35 U.S.C. §119 (a) of a Korean Patent Application No. 10-2009-0047626, filed on May 29, 2009, in the Korean Intellectual Property Office, the entire disclosure of which is incorporated herein by reference for all purposes.

BACKGROUND

1. Field

The following description relates to a method of sharing a frequency resource between a plurality of transmission/reception pairs in a communication system.

2. Description of Related Art

Researches on a communication system that includes a plurality of transmission/reception pairs have been pursued to increase data transmission rate and reliability of communication. To increase efficiency of the communication system, the plurality of transmission/reception pairs may use the same frequency resource. An example of a transmission/reception pair is a base station and a terminal that may be referred to as a base station-terminal pair. Each of the plurality of transmission/reception pairs may be a base station-terminal pair in a multi-macro cellular environment, and the plurality of base station-terminal pairs may increase a cell capacity and may increase efficiency at a cell edge by using the same frequency resource.

In the multi-macro cellular environment, the plurality of base station-terminal pairs work together as a coordinated set. The base station-terminal pairs may have difficulty in coordinating a resource in real time, for example, because of the mobility of the terminals. To coordinate the resource in real time, base stations may exchange information such as scheduling information.

A relay channel, for example, an X2 channel, may be used by base stations to coordinate inter-cell interference. 3rd Generation Partnership Project (3GPP) Long Term Evolution (LTE) defines an X2 channel as an interface between base stations, and the X2 channel allows several messages for Inter-Cell Interference Coordination (ICIC). However, a period of exchanging messages between base stations in the X2 channel can be several tens of milliseconds which is excessively long. Therefore, when the terminals have a mobility, the base stations may have difficulty in exchanging information in an X2 channel in real time.

SUMMARY

In one general aspect, there is provided a method of inter-cell coordination of a coordinated set including a plurality of transmission/reception pairs, the method including setting difference values between transmission times and application times of scheduling information of the plurality of transmission/reception pairs, and providing information related to the difference values to the plurality of transmission/reception pairs.

In the method, scheduling information of a predetermined target transmission/reception pair may be transmitted from a terminal of the target transmission/reception pair to a neighboring transmission/reception pair using a predetermined control information channel.

In the method, the target transmission/reception pair may intend to generate scheduling information that includes an application time that is the same as an application time of scheduling information of the neighboring transmission/reception pair, and the scheduling information of the target transmission/reception pair may include information indicating that the target transmission/reception pair uses a frequency resource that is the same as a frequency resource that is used by the neighboring transmission/reception pair.

In the method, a difference value of the target transmission/reception pair may be greater than a difference value of the neighboring transmission/reception pair.

The method may further include transmitting, to the plurality of transmission/reception pairs, information of the plurality of transmission/reception pairs included in the coordinated set.

In the method, the setting of the difference values may set the difference values to be different from each other based on a sub-frame unit.

In the method, the setting of the difference value may set the difference values based on a mobility of the plurality of transmission/reception pairs.

In another general aspect, there is provided an operating method of a terminal, the method including receiving scheduling information of a target transmission/reception pair from a base station of the target transmission/reception pair, the scheduling information of the target transmission/reception pair being generated based on scheduling information of a first neighboring transmission/reception pair, recognizing a frequency resource for the target transmission/reception pair based on the scheduling information of the target transmission/reception pair, and transmitting the scheduling information of the target transmission/reception pair to a second neighboring transmission/reception pair, wherein difference values between transmission times and application times of the scheduling information of the target transmission/reception pair, the scheduling information of the first neighboring transmission/reception pair, and scheduling information of the second neighboring transmission/reception pair, are set to be different from each other based on a sub-frame unit, and the difference value of the first neighboring transmission/reception pair is greater than the difference value of the target transmission/reception pair.

When the application time of the scheduling information of the target transmission/reception pair is the same as the application time of the scheduling information of the first neighboring transmission/reception pair, the base station of the target transmission/reception pair may allocate a frequency resource that is the same as a frequency resource that is used by the first neighboring transmission/reception pair, as the frequency resource for the target transmission/reception pair.

In the method, the transmitting of the scheduling information may transmit the scheduling information of the target transmission/reception pair to the second neighboring transmission/reception pair when a difference value of the second neighboring transmission pair is less than the difference value of the target transmission/reception pair.

In the method, the transmitting of the scheduling information may transmit the scheduling information of the target transmission/reception pair using a control information channel allocated in advance.

In the method, the difference values may be set to be different from each other based on a mobility of at least one of the target transmission/reception pair, the neighboring transmission/reception pair, and the other neighboring transmission/reception pair.

In still another general aspect, there is provided an operating method of a base station, the method including allocating a control information channel for a terminal of a target transmission/reception pair, receiving scheduling information of a neighboring transmission/reception pair transmitted using the control information channel, from a terminal of the target transmission/reception pair, allocating a frequency resource for the target transmission/reception pair based on the scheduling information of the neighboring transmission/reception pair, generating scheduling information of the target transmission/reception pair based on the allocated frequency resource, and transmitting the scheduling information of the target transmission/reception pair to the terminal of the target transmission/reception pair.

In the method, the allocating of the frequency resource may allocate the frequency resource for the target transmission/reception pair based on whether an application time of the scheduling information of the neighboring transmission/reception pair is the same as an application time of the scheduling information of the target transmission/reception pair.

In the method, the allocating of the frequency resource may include recognizing a frequency resource that is used by the neighboring transmission/reception pair based on the scheduling information of the neighboring transmission/reception pair, and allocating a frequency resource that is the same as the recognized frequency resource for the target transmission/reception pair.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
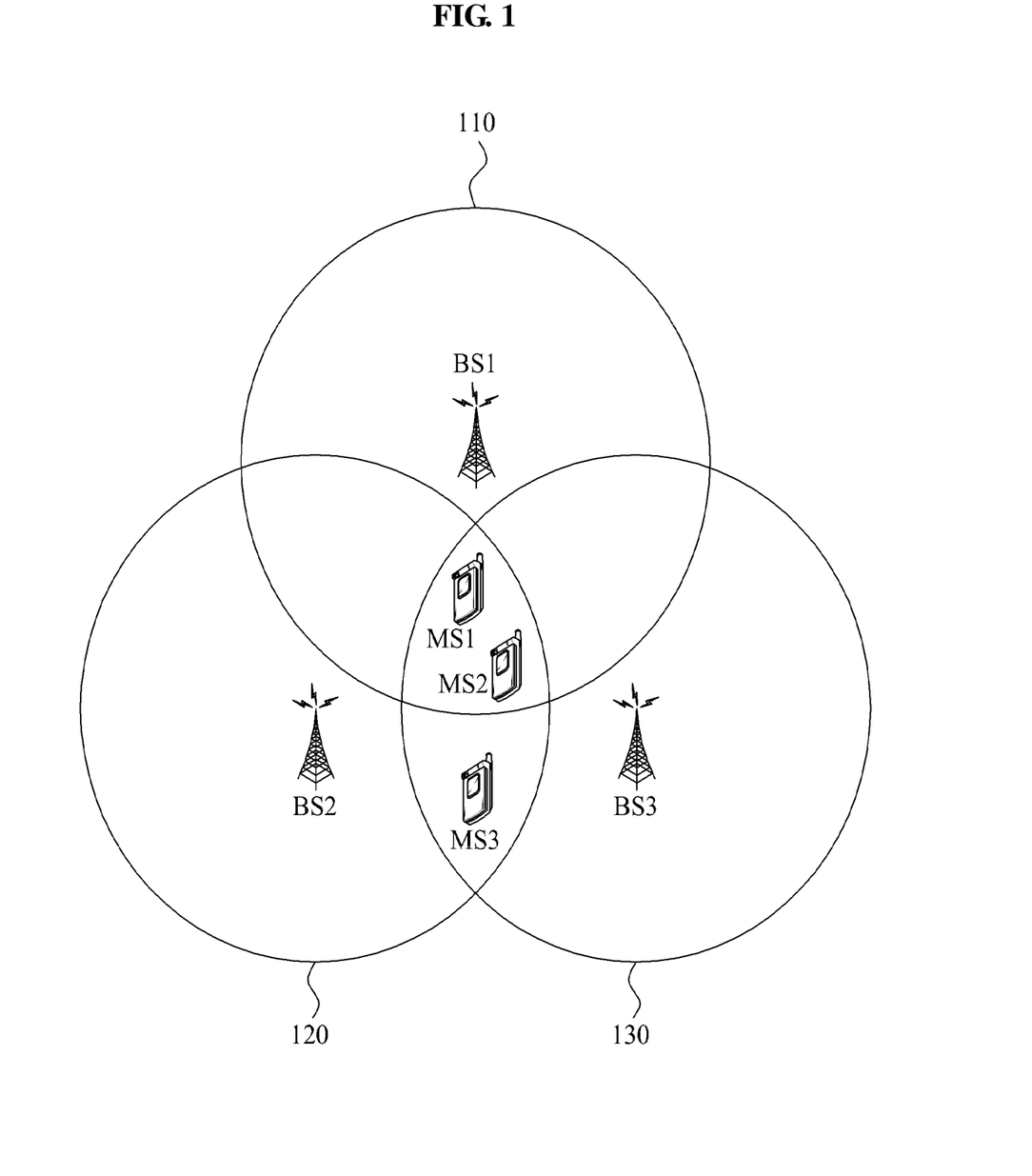
FIG. 1 is a diagram illustrating an exemplary communication system.

FIG. 1 illustrates an exemplary communication system.

The communication system of FIG. 1 may include a plurality of cells, for example, cells 110, 120, and 130. Each of the cells 110, 120, and 130 may include a transmission/reception pair that includes a base station and one or more terminals. The cell 110 may include a transmission/reception pair constituted by a first base station (BS1) and a first terminal (MS1). The cell 120 may include a transmission/reception pair constituted by a second base station (BS2) and a second terminal (MS2). The cell 130 may include a transmission/reception pair constituted by a third base station (BS3) and third terminal (MS3).

The plurality of transmission/reception pairs may coordinate with each other to use the same frequency resource, and thereby improve efficiency of the frequency resource and improve efficiency in a cell edge. To efficiently perform coordination between the plurality of transmission/reception pairs, prompt exchange of information is desired, particularly, scheduling information between the plurality of transmission/reception pairs is. Also, when terminals are mobile terminals, the plurality of transmission/reception pairs should exchange the information in real time to efficiently perform coordination.

<Scheduling Information Sharing Scheme when a Coordinated Set Exist>

Figure 2:
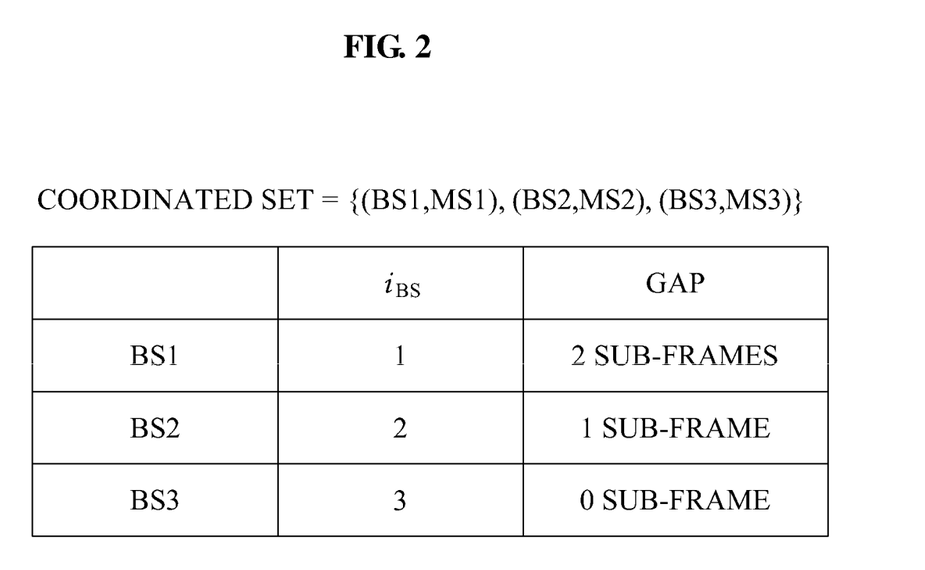
FIG. 2 is a table illustrating difference values set with respect to a coordinated set.

FIG. 2 illustrates a table including difference values set with respect to a coordinated set.

As described with reference to FIG. 1 and also illustrated in FIG. 2, the coordinated set includes transmission/reception pairs, (BS1, MS1), (BS2, MS2), and (BS3, MS3). Information of the coordinated set is shared by the transmission pairs, (BS1, MS1), (BS2, MS2), and (BS3, MS3).

Each base station of the transmission/reception pairs may transmit scheduling information of a corresponding transmission/reception pair to a corresponding terminal of the transmission/reception pair before performing transmission/reception of data. By transmitting scheduling information, the base station may share with the corresponding terminal, information of a resource that is to be used, for example, a radio resource, an allocated radio resource, and the like. Scheduling information may be, for example, MAP information. The scheduling information may include information related to a time resource and a frequency resource that a transmission/reception pair of intends to use.

An inner-cell coordinator that manages base stations may manage scheduling information, for example, the inner-cell coordinator may set difference values between application times and transmission times. Also, information of the set difference values may be provided to transmission/reception pairs included in the coordinated set, and a base station and a terminal of each of the transmission/reception pairs may recognize the difference values of the transmission/reception pairs.

In the non-limiting example illustrated in FIG. 2, each of the transmission/reception pairs intends to transmit scheduling information during a third sub-frame. The application times of scheduling information transmitted from the BS1, the BS2, and the BS3 is in the third sub-frame.

Referring to a table of FIG. 2, $i_{BS}$ is a transmission time of scheduling information, and GAP is a difference value between a transmission time and an application time. A difference value of scheduling information transmitted from the BS1 is a length of two sub-frames, a difference value of scheduling information transmitted from the BS2 is a length of one sub-frame, and a difference value of scheduling information transmitted from the BS3 is a length of zero sub-frames.

In one example, to transmit scheduling information applied in the third sub-frame, the BS1 may transmit scheduling information of a transmission/reception pair (BS1, MS1) during a first sub-frame, the BS2 may transmit scheduling information of a transmission/reception pair (BS2, MS2) during a second sub-frame, and the BS3 may transmit scheduling information of a transmission/reception pair (BS3, MS3) during the third sub-frame.

For example, as illustrated in FIG. 2, the inner-cell coordinator may set the difference values based on a sub-frame unit. The difference value may exist in a range of from 0 to N–1, where N represents the number of transmission/reception pairs in a corresponding coordinated set. The difference value may be set based on a mobility of terminals. For example, the difference value of a transmission/reception pair including a terminal having a relatively high mobility may be set to a relatively small value, and a difference value of a transmission/reception pair including a terminal having a relatively low mobility may be set to a relatively large value.

The inner-cell coordinator may set difference values to be different from each other for the scheduling information of a plurality of transmission/reception pairs, to enable transmission/reception pairs to have transmission times that are different and application times that are the same.

The exemplary embodiments may allocate a control information channel to predetermined locations. Terminals included in a predetermined coordinated set may use the control information channel. Scheduling information of a predetermined transmission/reception pair may be transmitted from a terminal of the predetermined transmission/reception pair to another transmission/reception pair using one or more control information channels.

For example, each of the terminals may transmit scheduling information corresponding to its own transmission/reception pair to at least one neighboring transmission/reception pair using an allocated control information channel. Each of the terminals may transmit the scheduling information corresponding to its own transmission/reception pair to the at least one neighboring transmission/reception pair based on difference values.

Figure 3:
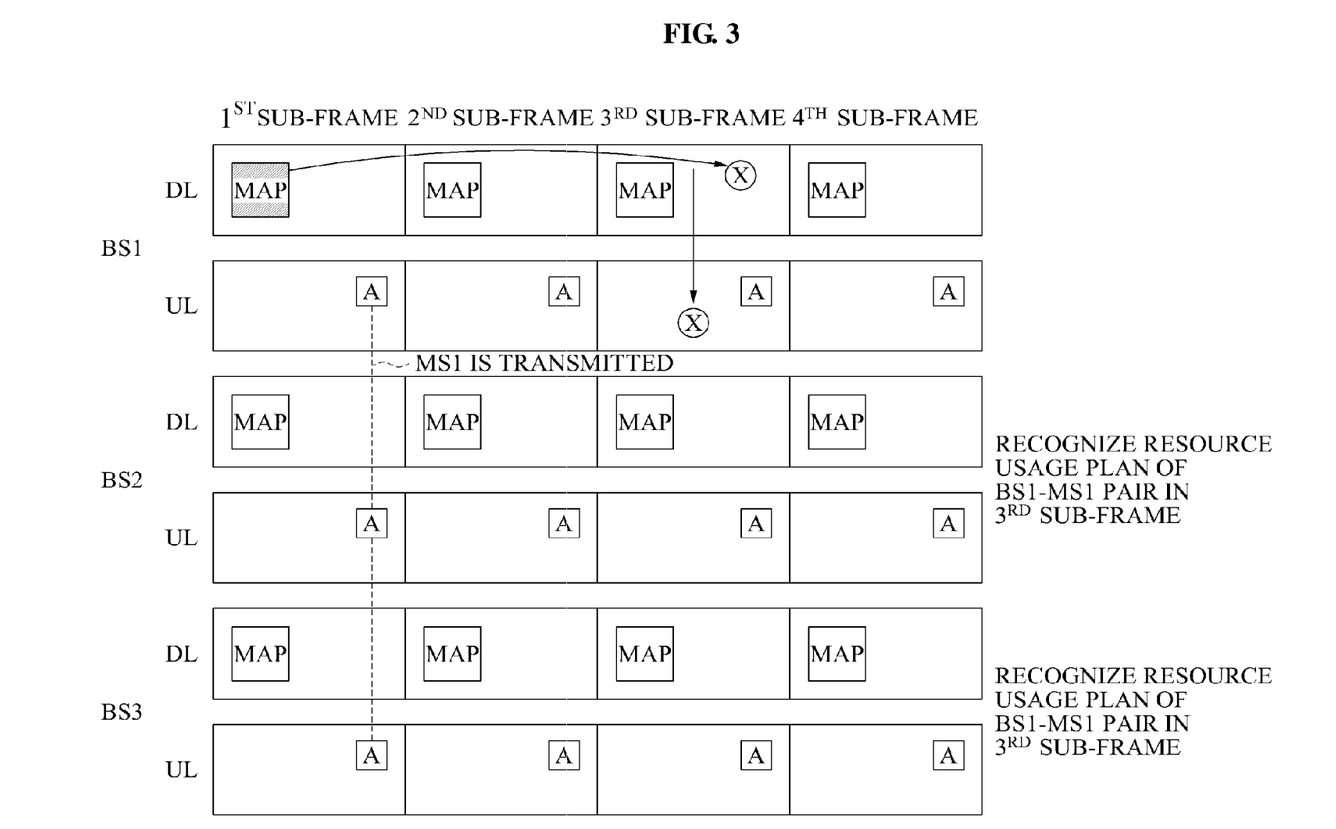
FIG. 3 is a diagram illustrating an operation of a first base station (BS1), a second base station (BS2), and a third base station (BS3) during a first sub-frame, according to the table of FIG. 2.

FIG. 3 illustrates an operation of the BS1, the BS2, and the BS3 during a first sub-frame, according to the table of FIG. 2.

Referring to FIG. 3, a difference value of the BS1 corresponds to a length of two sub-frames. The BS1 may transmit MAP during a first sub-frame that is to be applied to an MS1 during a third sub-frame. In this non-limiting example, the transmission time is the first sub-frame and the application time is the third sub-frame. MAP is an example of scheduling information, and may include information related to a time resource and a frequency resource that a transmission/reception pair of (BS1, MS1) intends to use.

The MS1 may recognize a radio resource allocated for itself based on the MAP received from the BS1 during the third sub-frame. Also, the MS1 may check whether there are other transmission/reception pairs having a difference value less than a difference value of the transmission/reception pair of (BS1, MS1).

A transmission/reception pair of (BS2, MS2) and a transmission/reception pair of (BS3, MS3) may have a difference value less than the difference value of the transmission/reception pair of (BS1, MS1). In this example, MS1 may transmit or broadcast the MAP received from the BS1 to the BS2 and BS3 which have a relatively small difference value using a control information channel (A) allocated in advance. Here, the control information channel (A) exists in an uplink section. The transmission may occur in the first sub-frame.

In this non-limiting example, the BS2 and the BS3 may recognize a resource usage plan of the transmission/reception pair of (BS1, MS1) based on the MAP of the transmission/reception pair of (BS1, MS1). More particularly, the BS2 and BS3 may recognize, in real time, a time resource and a frequency resource that the transmission/reception pair of (BS1, MS1) intends to use during the third sub-frame.

The BS2 and the BS3 may perform scheduling for the third sub-frame based on the resource usage plan of the transmission/reception pair of (BS1, MS1). That is, the BS2 and the BS3 may allocate to corresponding terminals a frequency resource that is the same as the frequency resource that the transmission/reception pair of (BS1, MS1) intends to use. In connection with the allocation of the time resource, the BS2 and the BS3 may allocate to the corresponding terminals either a time resource that is the same as the time resource of the transmission/reception pair of (BS1, MS1) or a different time resource.

As illustrated in FIG. 3, when scheduling information of the transmission/reception pair of (BS1, MS1) is intended to be applied in the third sub-frame, the BS2 and the BS3 are able to perform scheduling based on the existing scheduling information. Accordingly, the BS2 and the BS3 may allocate, to corresponding terminals, for example, the MS2 and the MS3, the same frequency resource that the transmission/reception pair of (BS1, MS1) intends to use. When the scheduling information is not intended to be applied in the third sub-frame, the BS2 and the BS3 may allocate a frequency resource and a time resource to corresponding terminals, for example, the MS2 and the MS3.

Figure 4:
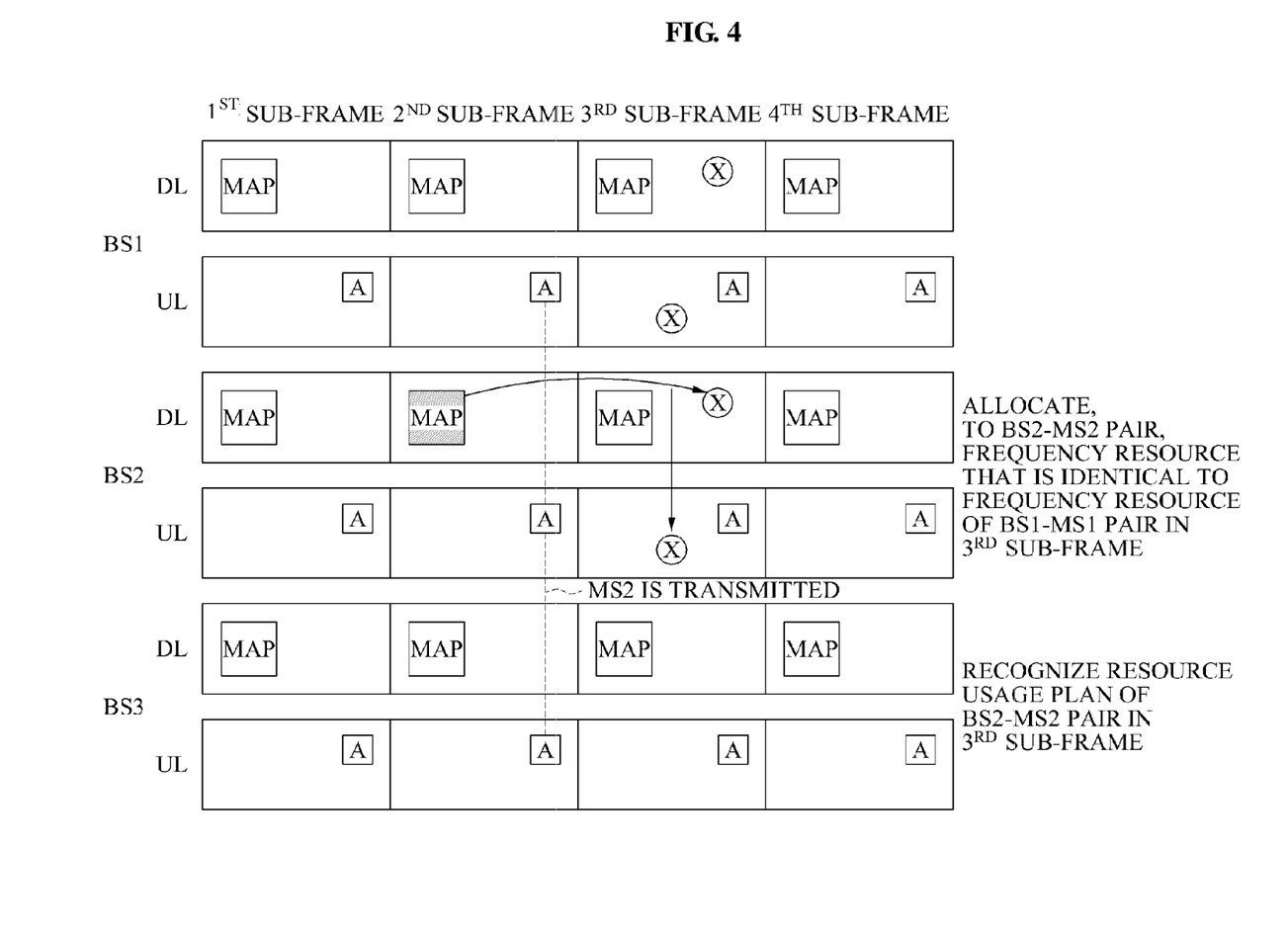
FIG. 4 is a diagram illustrating an operation of the BS1, the BS2, and the BS3 in a second sub-frame, according to the table of FIG. 2.

FIG. 4 illustrates an operation of the BS1, the BS2, and the BS3 in a second sub-frame, according to the table of FIG. 2.

Referring to FIG. 4, the BS2 may perform scheduling based on a resource usage plan of a transmission/reception pair of (BS1, MS1), and may generate MAP for a transmission/reception pair of (BS2, MS2). More particularly, the BS2 may allocate, to an MS2, a frequency resource that is the same as the frequency resource that the transmission/reception pair of (BS1, MS1) intends to use. The time resource allocated to the MS2 may be either the same or different from the time resource allocated to the MS1.

A difference value of the transmission/reception pair of (BS2, MS2) may correspond to a length of a single sub-frame. The MAP applied in a third sub-frame may be transmitted to the MS2 in a second sub-frame.

The MS2 may receive the MAP of the transmission/reception pair of (BS2, MS2) and may recognize a time resource and a frequency resource allocated to the MS2. Also, the MS2 may transmit the MAP of the transmission/reception pair of (BS2, MS2) to a neighboring transmission/reception pair. More particularly, the transmission/reception pair of (BS2, MS2) has a difference value less than a difference value of the transmission/reception pair of (BS1, MS1), and the difference value is greater than a difference value of a transmission/reception pair of (BS3, MS3). The MS2 may transmit or broadcast the MAP received from the BS2 to the BS3 using the control information channel (A) allocated in advance. The transmission may occur during the second sub-frame.

The BS3 may recognize a resource usage plan of the transmission/reception pair of (BS2, MS2) in the third sub-frame based on the MAP of the transmission/reception pair of (BS2, MS2). Accordingly, the BS3 may recognize resource usage plans of both the transmission/reception pair of (BS2, MS2) and the transmission/reception pair of (BS1, MS1).

Figure 5:
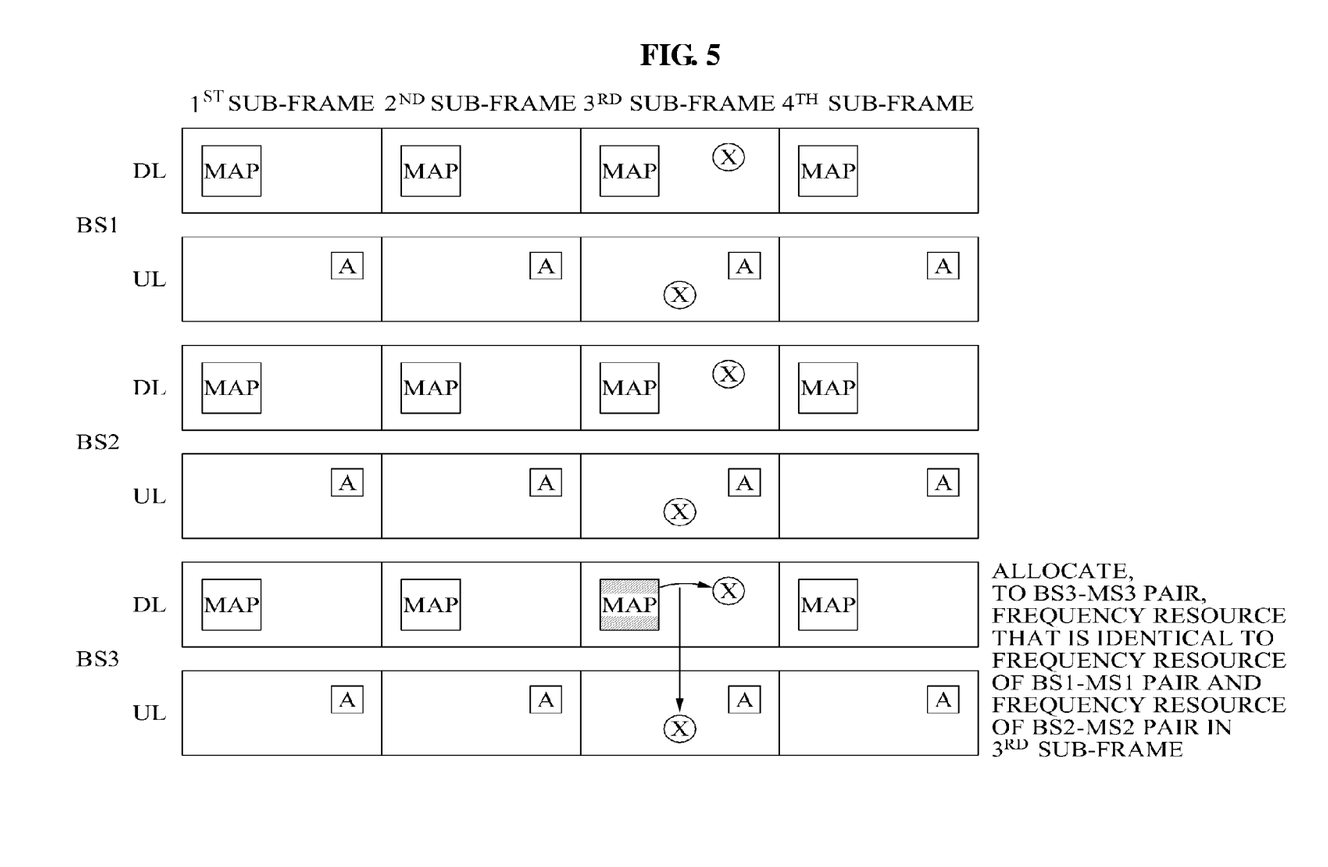
FIG. 5 is a diagram illustrating an operation of the BS1, the BS2, and the BS3 during a third sub-frame, according to the table of FIG. 2.

FIG. 5 illustrates an operation of the BS1, the BS2, and the BS3 during a third sub-frame, according to the table of FIG. 2.

As described above, the BS3 may recognize a resource usage plan of both a transmission/reception pair of (BS1, MS1) and a transmission/reception pair of (BS2, MS2). Also, referring to FIG. 5, the BS3 may allocate to an MS3 a frequency resource that is the same as the frequency resource used by the transmission/reception pair of (BS1, MS1) and the transmission/reception pair of (BS2, MS2), and generate MAP of (BS3, MS3).

A difference value of the transmission/reception pair of (BS3, MS3) corresponds to a length of the zero sub-frames, and thus, MAP applied in a third sub-frame may be transmitted to the MS3 in the third sub-frame.

Accordingly, the MS3 may recognize a radio resource, for example, a frequency resource and a time resource, based on the MAP transmitted from the BS3, and may perform data transmission/reception in the third frame using the radio resource.

<Scheduling Information Sharing Scheme when at Least Two Coordinated Sets Exist>

Figure 6:
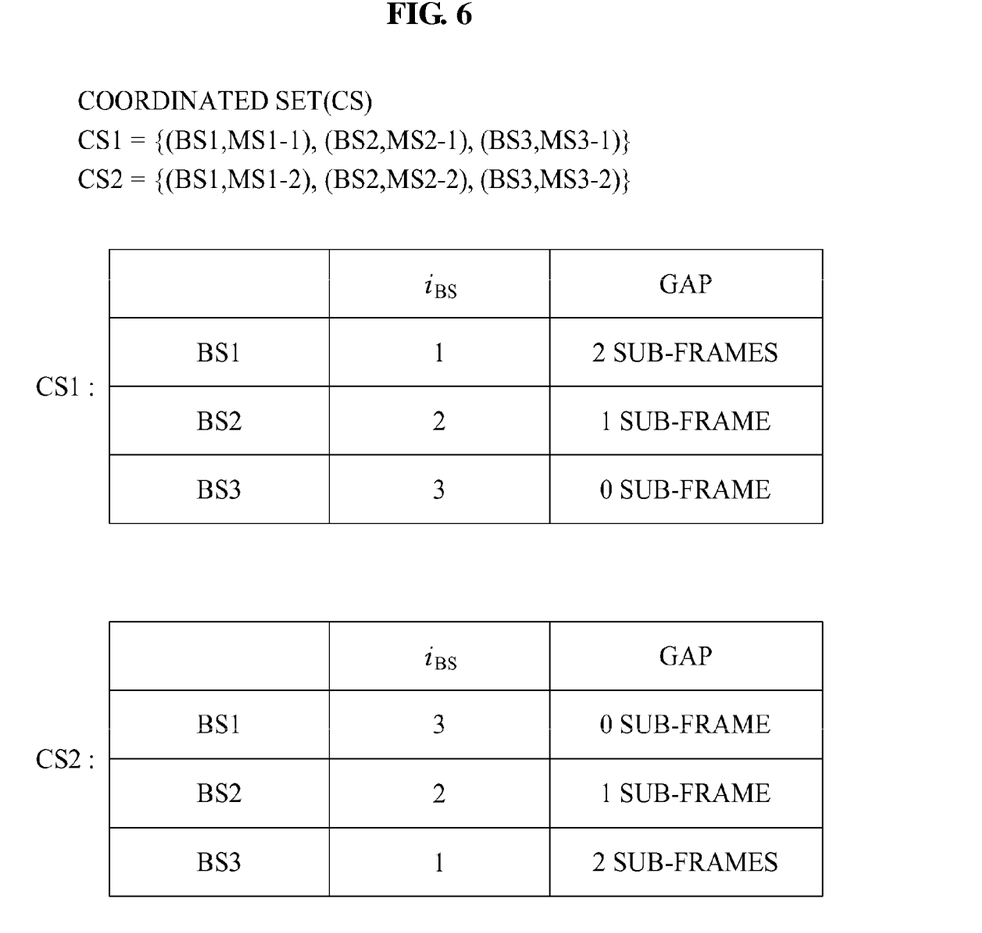
FIG. 6 illustrates tables showing difference values set with respect to two coordinated sets.

FIG. 6 illustrates tables showing difference values set with respect to two coordinated sets.

Referring to FIG. 6, illustrated are two coordinated sets (CS1 and CS2). The CS1 includes transmission/reception pairs of (BS1, MS1-1), (BS2, MS2-1), and (BS3, MS3-1), and the CS2 includes transmission/reception pairs of (BS1, MS1-2), (BS2, MS2-2), and (BS3, MS3-2).

Information as to the CS1 and CS2 is shared by the transmission/reception pairs in a corresponding CS. The information indicates which transmission/reception pairs are included in the CS1 and the CS2.

Also, an inner-cell coordinator may set difference values (GAPs) based on a sub-frame unit. That is, the inner-cell coordinator may set the GAPs to be different from each other for scheduling information of a plurality of transmission/reception pairs to enable transmission/reception pairs to have transmission times that are different and application times that are the same.

In this non-limiting example, the transmission/reception pairs intend to transmit scheduling information that is applied in a third sub-frame. The application times of all scheduling information transmitted from the CS1 and the CS2 to the BS1, the BS2, and the BS3 are in the third sub-frame. $i_{BS}$ is a transmission time of scheduling information, and a GAP is a difference value between a transmission time and an application time.

Referring to the table corresponding to the CS1, the transmission time of scheduling information for the transmission/reception pair of (BS1, MS1-1) exists in a first sub-frame, and the GAP is a length of two sub-frames. The transmission time of scheduling information for the transmission/reception pair of (BS2, MS2-1) exists in a second sub-frame, and the GAP is a length of one sub-frame. The transmission time of scheduling information for the transmission/reception pair of (BS3, MS3-1) exists in the third sub-frame, and a GAP is a length of zero sub-frames.

Referring to the table corresponding to the CS2, the transmission time of scheduling information for the transmission/reception pair of (BS1, MS1-2) exists in the third sub-frame, and the GAP is the length of zero sub-frames. The transmission time of scheduling information for the transmission/reception pair of (BS2, MS2-2) exists in the second sub-frame, and the GAP is the length of one sub-frame. The transmission time of scheduling information for the transmission/reception pair of (BS3, MS3-2) exists in the first sub-frame, and the GAP is the length of two sub-frames.

Figure 7:
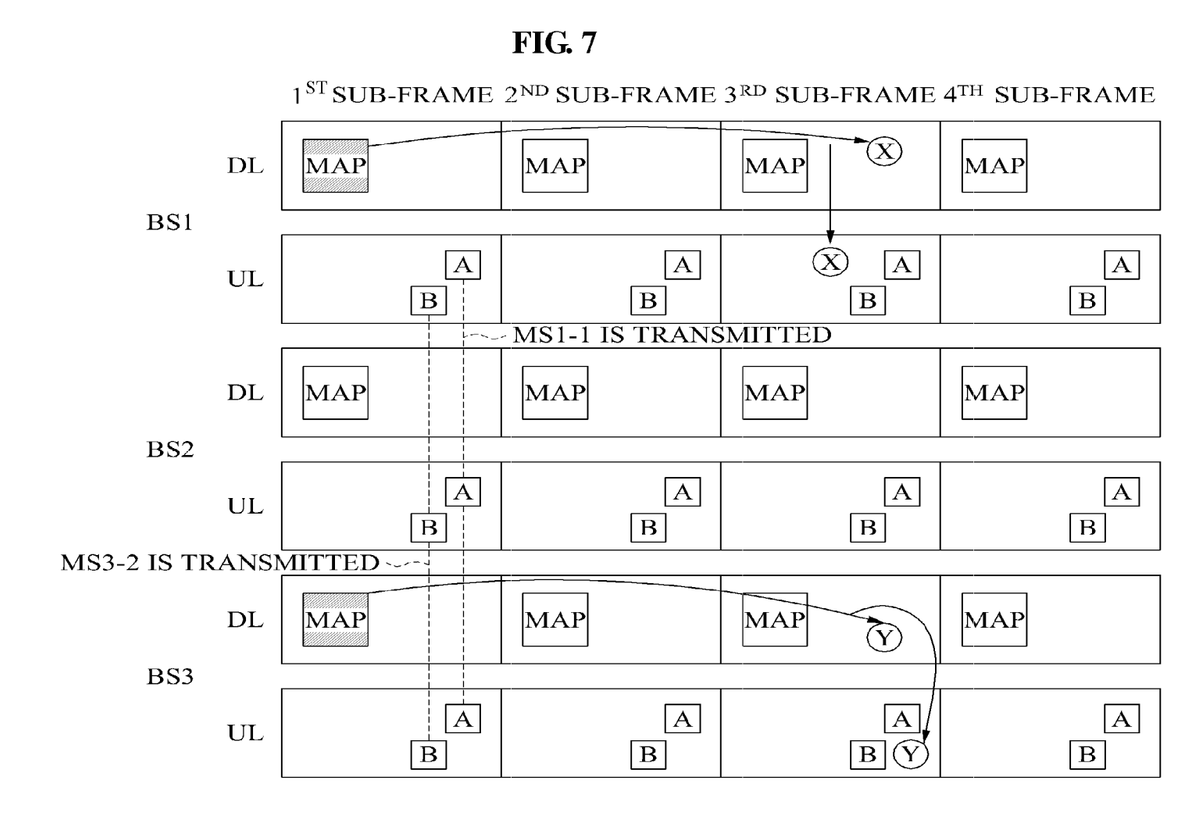
FIG. 7 is a diagram illustrating an operation of the BS1, the BS2, and the BS3 during a first sub-frame, according to the table of FIG. 6.

FIG. 7 illustrates an operation of the BS1, the BS2, and the BS3 during a first sub-frame, according to the table of FIG. 6.

Referring to FIG. 7, the BS1 may generate MAP for an MS1-1 of a CS1 in a first sub-frame. Also, the BS3 may generate MAP for an MS3-2 of a CS2 in the first sub-frame. The BS1 and the BS3 may transmit the generated MAPs to the MS1-1 and the MS3-2, respectively. The application times of the MAPs generated by the BS1 and the BS3 exist in a third sub-frame. The 'X' indicates a radio resource for transmission/reception pairs included in the CS1, and the 'Y' indicates a radio resource for transmission/reception pairs included in the CS2.

Referring to the table corresponding to the CS1 of FIG. 6, difference values of the BS2 and the BS3 are less than a difference value of the BS1, and the MS1-1 may transmit the MAP received from the BS1 to the BS2 and the BS3 using a control information channel (A). The transmission may occur in the first sub-frame. Referring to the table corresponding to the CS2 of FIG. 6, difference values of the BS1 and the BS2 are less than a difference value of the BS3, and the MS3-2 may transmit the MAP received from the BS3 to the BS1 and the BS2 using a control information channel (B). The transmission may occur in the first sub-frame.

Accordingly, the BS2 and the BS3 may recognize a resource usage plan of the transmission/reception pair of (BS1, MS1-1) in the third sub-frame, and the BS1 and the BS2 may recognize a resource usage plan of the transmission/reception pair of (BS3, MS3-3) in the third sub-frame.

Figure 8:
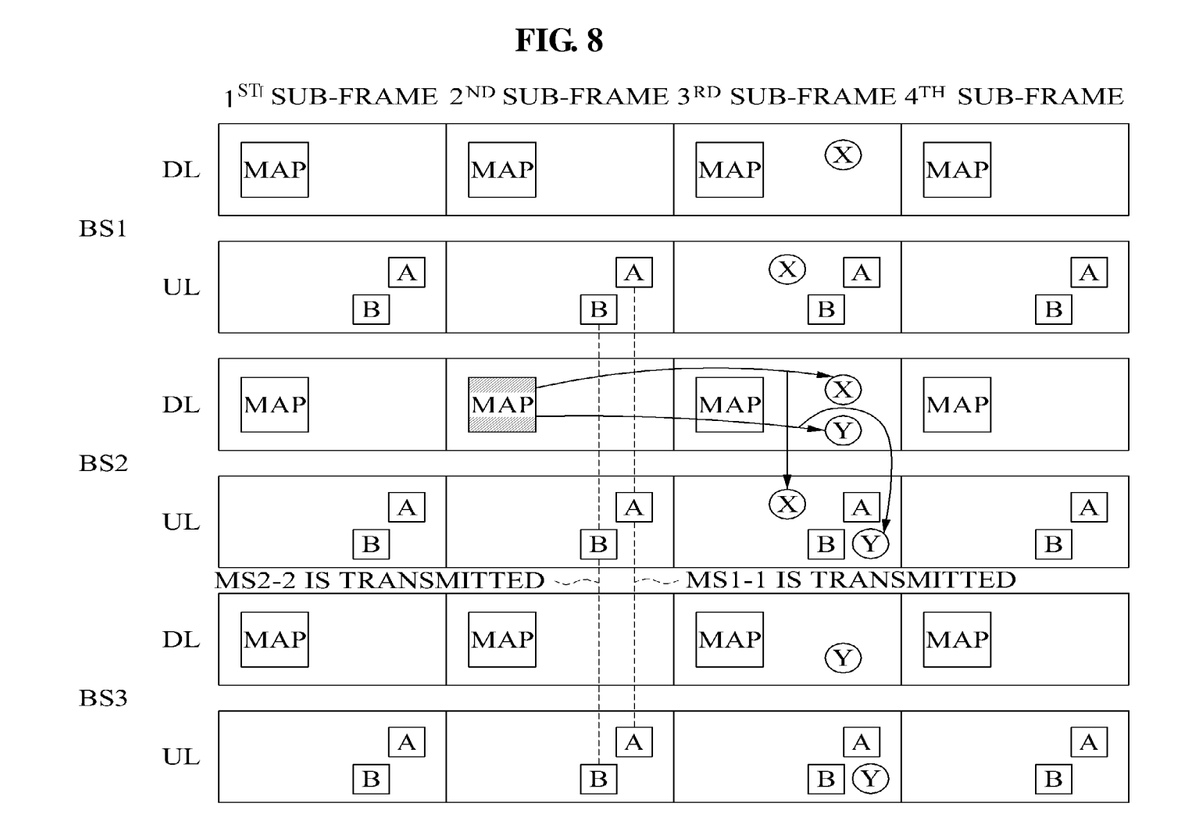
FIG. 8 is a diagram illustrating an operation of the BS1, the BS2, and the BS3 during a second sub-frame, according to the table of FIG. 6.

FIG. 8 illustrates an operation of the BS1, the BS2, and the BS3 during a second sub-frame, according to the table of FIG. 6.

Referring to FIG. 8, the BS2 may allocate a frequency resource that an MS2-1 uses in a third sub-frame based on a resource usage plan of a transmission/reception pair of (BS1, MS1-1). It is recognized that a location of 'X' in a transmission frame of the BS2 is the same as a location of 'X' in a transmission frame of the BS1, indicating a radio resource used by the transmission/reception pair of (BS1, MS1-1) is the same as a radio resource used by the transmission/reception pair of (BS2, MS2-1). The BS2 may generate MAP for the transmission/reception pair of (BS2, MS2-1) in the third sub-frame and may transmit the generated MAP to the MS2-1.

The BS2 may allocate a frequency resource that MS2-2 uses in the third sub-frame based on a resource usage plan of a transmission/reception pair of (BS3, MS3-2).

The allocation may occur in the second sub-frame. Scheduling information of the transmission/reception pair of (BS3, MS3-2) has an application time that is to be applied in the third sub-frame. The BS2 may allocate, to the MS2-2, a frequency resource that is the same as a frequency resource used by the transmission/reception pair of (BS3, MS3-2). The location of 'Y' in a transmission frame of the BS2 is the same as a location of 'Y' in a transmission frame of the BS3, indicating a radio resource used by the transmission/reception pair of (BS3, MS3-2) that is the same as a radio resource used by the transmission/reception pair of (BS2, MS2-2). The BS2 may generate MAP for the transmission/reception pair of (BS2, MS2-2) in the third sub-frame, and may transmit the generated MAP to the MS2-2.

The MS2-1 may transmit MAP for the transmission/reception pair of (BS2, MS2-1) received from the BS2 to the BS3 using a control information channel (A). The transmission may occur in the second sub-frame. Also, the MS2-2 may transmit MAP for the transmission/reception pair of (BS2, MS2-2) received from the BS2 to the BS1 using a control information channel (B). The transmission may occur in the second sub-frame.

The BS3 may recognize a resource usage plan of the transmission/reception pair of (BS2, MS2-1) in the third sub-frame based on the MAP for the transmission/reception pair of (BS2, MS2-1). The BS1 may recognize a resource usage plan of the transmission/reception pair of (BS2, MS2-2) in the third sub-frame based on the MAP for the transmission/reception pair of (BS2, MS2-2).

Also, although it will be described with reference FIG. 9, the BS3 may allocate, to a transmission/reception pair of (BS3, MS3-1), a frequency resource that is the same as the frequency resource used by the transmission/reception pair of (BS2, MS2-1), and the BS1 may allocate, to transmission/reception pair of (BS1, MS1-2), a frequency resource that is the same as the frequency resource used by the transmission/reception pair of (BS2, MS2-2).

Figure 9:
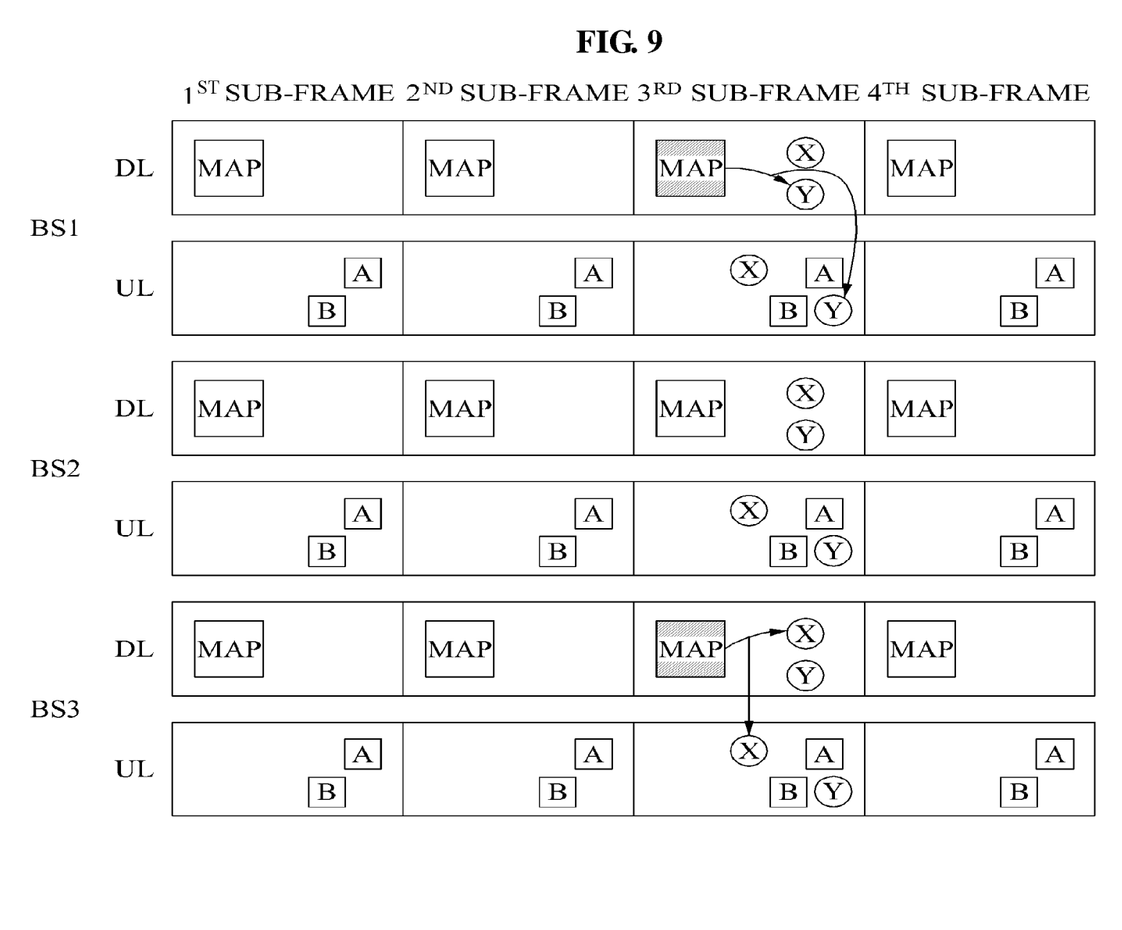
FIG. 9 is a diagram illustrating an operation of the BS1, the BS2, and the BS3 during a third sub-frame, according to the table of FIG. 6.

FIG. 9 illustrates an operation of the BS1, the BS2, and the BS3 during a third sub-frame, according to the table of FIG. 6.

Referring to FIG. 9, as recognized from 'Y' of a transmission frame of the BS1, the BS1 may allocate, to a transmission/reception pair of (BS1, MS1-2), a frequency resource that is the same as the frequency resource used by the transmission/reception pair of (BS2, MS2-2). Also, as recognized from 'X' of a transmission frame of the BS3, the BS3 may allocate, to a transmission/reception pair of (BS3, MS3-1), a frequency resource that is the same as the frequency resource used by a transmission/reception pair of (BS2, MS2-1).

Referring to FIGS. 6 through 9, transmission/reception pairs of (BS1, MS1-1), (BS2, MS2-1), (BS3, MS3-1) included in the CS1 may share scheduling information using a control information channel (A) based on corresponding GAPs, and may allocate/use the same radio resource. Also, transmission/reception pairs of (BS1, MS1-2), (BS2, MS2-2), (BS3, MS3-2) included in the CS2 may share scheduling information using a control information channel (B) based on corresponding GAPs, and may allocate/use the same radio resource. Therefore, a plurality of transmission/reception pairs share scheduling information in real time, and the same radio resource, for example, a frequency resource or a time resource, may be used by a plurality of transmission/reception pairs.

Figure 10:
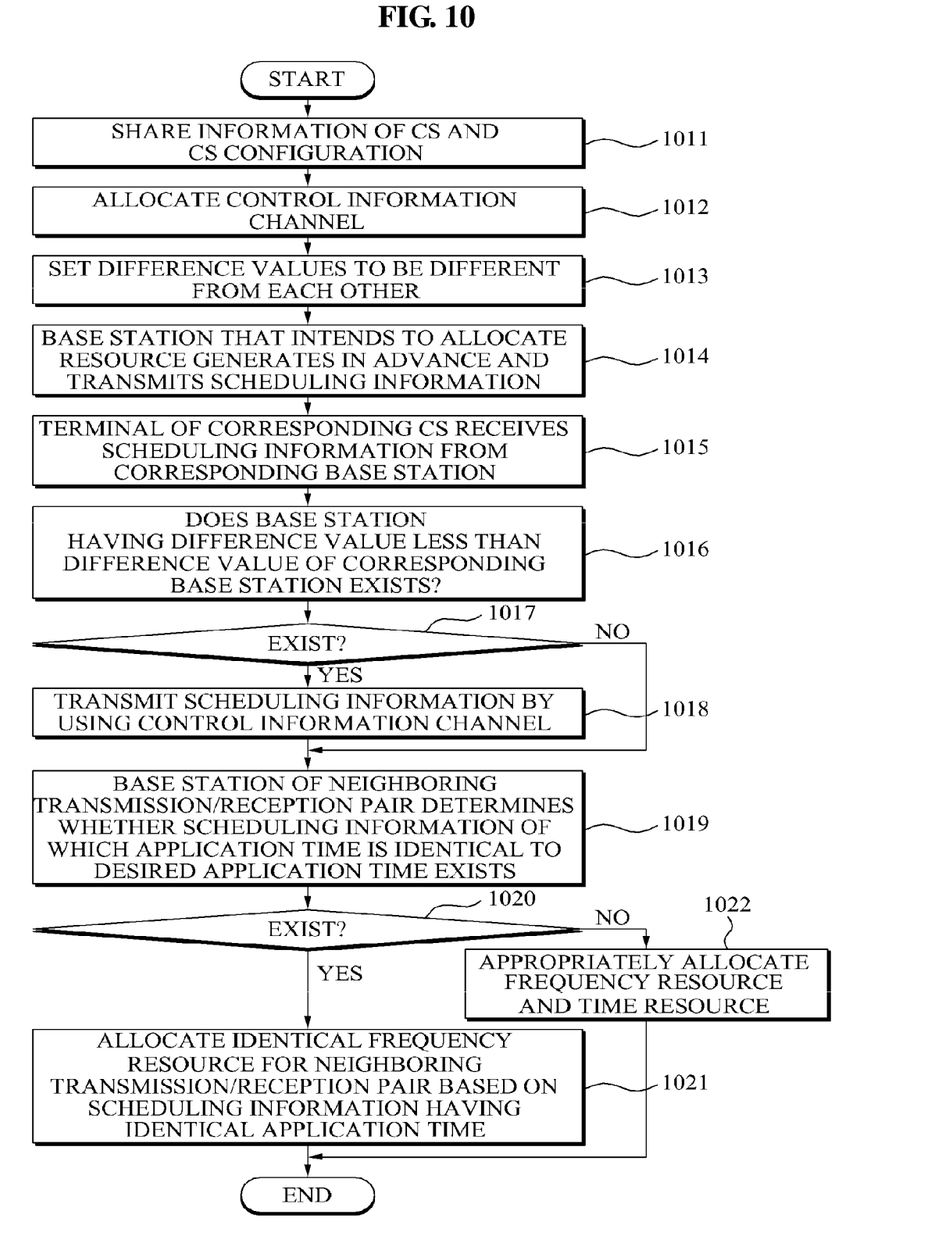
FIG. 10 is a flowchart illustrating an exemplary method of an inner-cell coordinator, base stations, and a terminal.

FIG. 10 is a flowchart illustrating an exemplary method of inter-cell coordination of a coordinated set including a plurality of transmission/reception pairs.

In a non-limiting example, referring to FIG. 10, an inner-cell coordination method is provided. The method may be performed by an inner-cell coordinator. The inner-cell coordinator may organize a coordinated set including transmission/reception pairs that intend to use the same frequency resource, and may share information about the coordinated set with transmission/reception pairs in 1011.

Base stations may allocate a control information channel to enable each of the terminals to transmit, in real time, scheduling information of a predetermined transmission/reception pair to another transmission/reception pair in 1012.

The inner-cell coordinator sets difference values between application times and transmission times of scheduling information to be different from each other in 1013. The difference values may be set variously based on a sub-frame unit, for example, the difference value may be set to one, two, three, four, or other desired number. The inner-cell coordinator may set the difference values based on a mobility of the transmission/reception pairs, for example, based on the mobility of one or more terminals.

A base station that intends to allocate a radio resource in a predetermined coordinated set or a corresponding coordinated set, for example, a base station of a target transmission/reception pair, may prepare in advance scheduling information based on a corresponding difference value, and may transmit the scheduling information to a terminal of the target transmission/reception pair at a corresponding transmission time in 1014.

The terminal of the target transmission/reception pair in the predetermined or the corresponding coordinated set may receive the scheduling information from the base station of the target transmission/reception pair in 1015. The terminal of the target transmission/reception pair may recognize an allocated radio resource based on the scheduling information.

The terminal of the target transmission/reception pair may determine whether there exists a base station having a difference value less than the difference value of the base station of the target transmission/reception pair in 1016. For example, the terminal of the target transmission/reception pair may determine whether a base station of a neighboring transmission/reception pair has a difference value less than a difference value of the base station of the target transmission/reception pair based on the difference values of the corresponding coordinated set shared in advance in 1017.

When the base station of the neighboring transmission/reception pair has a difference value less than the difference value of the base station of the target transmission/reception pair, the terminal of the target transmission/reception pair may transmit or broadcast scheduling information received from the base station of the target transmission/reception pair to the base station of neighboring transmission/reception pair through the control information channel in 1018.

The first neighboring transmission/reception pair may repeat operation 1016. A terminal of the first neighboring transmission/reception pair may determine whether there exists a second neighboring base station that has a difference value less than the difference value of the base station of the first transmission/reception pair. If the terminal of the first transmission/reception pair finds a second neighboring base station that has a difference value less than the base station of the first neighboring transmission/reception pair, the terminal of the first neighboring transmission/reception pair may transmit or broadcast scheduling information received from the base station of the first neighboring transmission/reception pair to the base station of the second neighboring transmission/reception pair. This process may be repeated until a transmission/reception pair does not find a neighboring base station that has a difference value less than the difference value of the base station.

When the base station of the neighboring transmission/reception pair does not have a difference value less than the difference value of the base station of the target transmission/reception pair, operation 1018 may be skipped. In the same manner, when a first neighboring base station determines that a neighboring base station does not have a difference value less than the difference value of the second neighboring base station, operation 1018 may be skipped.

The base station of the neighboring transmission/reception pair may determine whether the scheduling information includes an application time that is the same as a desired application time in 1019. For example, the base station of the neighboring transmission/reception pair may determine in 1020 whether scheduling information includes an application time that is the same as the desired application time based on application times of scheduling information of another transmission/reception pair received through the control information channel.

When the scheduling information has an application time that is the same as a desired application time, the base station of the neighboring transmission/reception pair may allocate a frequency resource that is the same as a frequency resource used by a transmission/reception pair in operation 1021. The scheduling information for the neighboring transmission/reception pair may be based on the existing scheduling information of the target transmission/reception pair. The base station of the neighboring transmission/reception pair may allocate the same time resource or may allocate a different time resource.

When the scheduling information does not have an application time that is the same as a desired application time, the base station of the neighboring transmission/reception pair may allocate a frequency resource and a time resource in operation 1022.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The computer-readable media may be non-transitory computer-readable media. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, a terminal described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of inter-cell coordination of a coordinated set including a plurality of transmission/reception pairs, the method comprising:

setting difference values between transmission times and application times of scheduling information of the plurality of transmission/reception pairs; and providing information related to the difference values to the plurality of transmission/reception pairs wherein each difference value of each transmission/reception pair is different from each other, wherein an inter-cell coordinator sets the difference values to be different from each other for scheduling information of the plurality of transmission/reception pairs such that the transmission/reception pairs have transmission times that are different and application times that are the same.

2. The method of claim 1, wherein scheduling information of a predetermined target transmission/reception pair is transmitted from a terminal of the target transmission/reception pair to a neighboring transmission/reception pair using a predetermined control information channel.

3. The method of claim 2, wherein the target transmission/reception pair intends to generate scheduling information that includes an application time that is the same as an application time of scheduling information of the neighboring transmission/reception pair, and the scheduling information of the target transmission/reception pair includes information indicating that the target transmission/reception pair uses a frequency resource that is the same as a frequency resource that is used by the neighboring transmission/reception pair.

4. The method of claim 2, wherein a difference value of the target transmission/reception pair is greater than a difference value of the neighboring transmission/reception pair.

5. The method of claim 1, further comprising:
transmitting, to the plurality of transmission/reception pairs, information of the plurality of transmission/reception pairs included in the coordinated set.

6. The method of claim 1, wherein the setting of the difference values sets the difference values to be different from each other based on a sub-frame unit.

7. The method of claim 1, wherein the setting of the difference value sets the difference values based on a mobility of the plurality of transmission/reception pairs.

8. The method of claim 7, wherein the difference value of a transmission/reception pair including a terminal having a high mobility is set to a small value.

9. The method of claim 7, the difference value of a transmission/reception pair including a terminal having a low mobility is set to a large value.

10. An operating method of a terminal, the method comprising:

receiving scheduling information of a target transmission/reception pair from a base station of the target transmission/reception pair, the scheduling information of the target transmission/reception pair being generated based on scheduling information of a first neighboring transmission/reception pair;

recognizing a frequency resource for the target transmission/reception pair based on the scheduling information of the target transmission/reception pair; and transmitting the scheduling information of the target transmission/reception pair to a second neighboring transmission/reception pair, wherein difference values between transmission times and application times of the scheduling information of the target transmission/reception pair, the scheduling information of the first neighboring transmission/reception pair, and scheduling information of the second neighboring transmission/reception pair, are set to be different from each other based on a sub-frame unit, and the difference value of the first neighboring transmission/reception pair is greater than the difference value of the target transmission/reception pair.

11. The method of claim 10, wherein when the application time of the scheduling information of the target transmission/reception pair is the same as the application time of the scheduling information of the first neighboring transmission/reception pair, the base station of the target transmission/reception pair allocates a frequency resource that is the same as a frequency resource that is used by the first neighboring transmission/reception pair, as the frequency resource for the target transmission/reception pair.

12. The method of claim 10, wherein the transmitting of the scheduling information transmits the scheduling information of the target transmission/reception pair to the second neighboring transmission/reception pair when a difference value of the second neighboring transmission pair is less than the difference value of the target transmission/reception pair.

13. The method of claim 10, wherein the transmitting of the scheduling information transmits the scheduling information of the target transmission/reception pair using a control information channel allocated in advance.

14. The method of claim 10, wherein the difference values are set to be different from each other based on a mobility of at least one of the target transmission/reception pair, the neighboring transmission/reception pair, and the other neighboring transmission/reception pair.

15. An operating method of a base station, the method comprising:
   allocating a control information channel for a terminal of a target transmission/reception pair;
   receiving scheduling information of a neighboring transmission/reception pair transmitted using the control information channel, from a terminal of the target transmission/reception pair;
   allocating a frequency resource for the target transmission/reception pair based on the scheduling information of the neighboring transmission/reception pair;
   generating scheduling information of the target transmission/reception pair based on the allocated frequency resource;
   setting difference values between transmissions times and application times of the scheduling information of neighboring and target transmission/reception pairs based on a sub-frame unit; and
   transmitting the scheduling information of the target transmission/reception pair to the terminal of the target transmission/reception pair wherein each difference value of each transmission/reception pair is different from each other.

16. The method of claim 15, wherein the allocating of the frequency resource allocates the frequency resource for the target transmission/reception pair based on whether an application time of the scheduling information of the neighboring transmission/reception pair is the same as an application time of the scheduling information of the target transmission/reception pair.

17. The method of claim 15, wherein the allocating of the frequency resource comprises:
   recognizing a frequency resource that is used by the neighboring transmission/reception pair based on the scheduling information of the neighboring transmission/reception pair, and
   allocating a frequency resource that is the same as the recognized frequency resource for the target transmission/reception pair.

18. A non-transitory computer readable recording medium storing a program implementing a method of an inter-cell coordination of a coordinated set including a plurality of transmission/reception pairs, the method comprising:
   setting difference values between transmission times and application times of scheduling information of the plurality of transmission/reception pairs; and
   providing information related to the difference values to the plurality of transmission/reception pairs wherein each difference value of each transmission/reception pair is different from each other,
   wherein an inter-cell coordinator sets the difference values to be different from each other for scheduling information of the plurality of transmission/reception pairs such that the transmission/reception pairs have transmission times that are different and application times that are the same.

* * * * *